United States Patent [19]

Fukuhara

[11] Patent Number: 4,978,290
[45] Date of Patent: Dec. 18, 1990

[54] MOLDING DEVICE
[75] Inventor: Keiji Fukuhara, Hiroshima, Japan
[73] Assignee: Mazda Motor Corporation, Hiroshima, Japan
[21] Appl. No.: 344,953
[22] Filed: Apr. 28, 1989
[30] Foreign Application Priority Data Apr. 28, 1988 [JP]  Japan .................. 63-105936

[51] Int. Cl.$^5$ ............................. B29C 47/92
[52] U.S. Cl. .................. 425/147; 425/133.1; 425/523; 425/532
[58] Field of Search ............ 425/147, 149, 133.1, 425/523, 532

[56] References Cited

U.S. PATENT DOCUMENTS

| 3,321,803 | 5/1967 | Corbett | 425/133.1 X |
|---|---|---|---|
| 4,067,673 | 1/1978 | Hendry | 425/147 X |
| 4,120,633 | 10/1978 | Feuerherm | 425/462 |
| 4,149,839 | 4/1979 | Iwawaki et al. | 425/532 X |
| 4,159,293 | 6/1979 | Fukase et al. | 425/532 X |
| 4,185,954 | 1/1980 | Murakami et al. | 425/462 |
| 4,240,996 | 12/1980 | Hunkar | 425/149 X |
| 4,297,092 | 10/1981 | Goron | 425/133.1 |
| 4,302,170 | 11/1981 | Goron | 425/133.1 |
| 4,338,071 | 7/1982 | Daubenbuchel et al. | 425/532 X |
| 4,422,838 | 12/1983 | Iwawaki et al. | 264/540 X |
| 4,472,129 | 9/1984 | Siard | 425/381 |
| 4,512,943 | 4/1985 | Hahn et al. | 264/173 |
| 4,522,775 | 6/1985 | Briggs et al. | 264/173 |
| 4,565,515 | 1/1986 | Maier | 425/381 |
| 4,578,025 | 3/1986 | Ando et al. | 425/133.1 |
| 4,717,326 | 1/1988 | Motonaga et al. | 425/133.1 |
| 4,735,760 | 4/1988 | Kumazaki | 425/149 X |

FOREIGN PATENT DOCUMENTS

| 52-37026 | 9/1977 | Japan . |  |
| 55-39448 | 3/1980 | Japan . |  |
| 58-23212 | 5/1983 | Japan . |  |
| 58-220738 | 12/1983 | Japan . |  |
| 62-99115 | 5/1987 | Japan | 425/133.1 |

Primary Examiner—Richard L. Chiesa
Attorney, Agent, or Firm—Fleit, Jacobson, Cohn, Price, Holman & Stern

[57] ABSTRACT

A molding device for manufacturing a multiple layer product includes an extruder for extruding material to be molded, a blow head for receiving the material from the extruders and for supplying the material to a mold, and a passage connected with the extruder and divided into a plurality of branch passages connected with the blow head. An accumulator is provided on each of the branch passages, and a detector is provided in the accumulator for detecting the quantity of material introduced into the accumulator. A lock device locks the accumulator when the quantity of the material detected by the detector reaches a predetermined value, As a result a homogeneous layer can be obtained across the product.

20 Claims, 7 Drawing Sheets

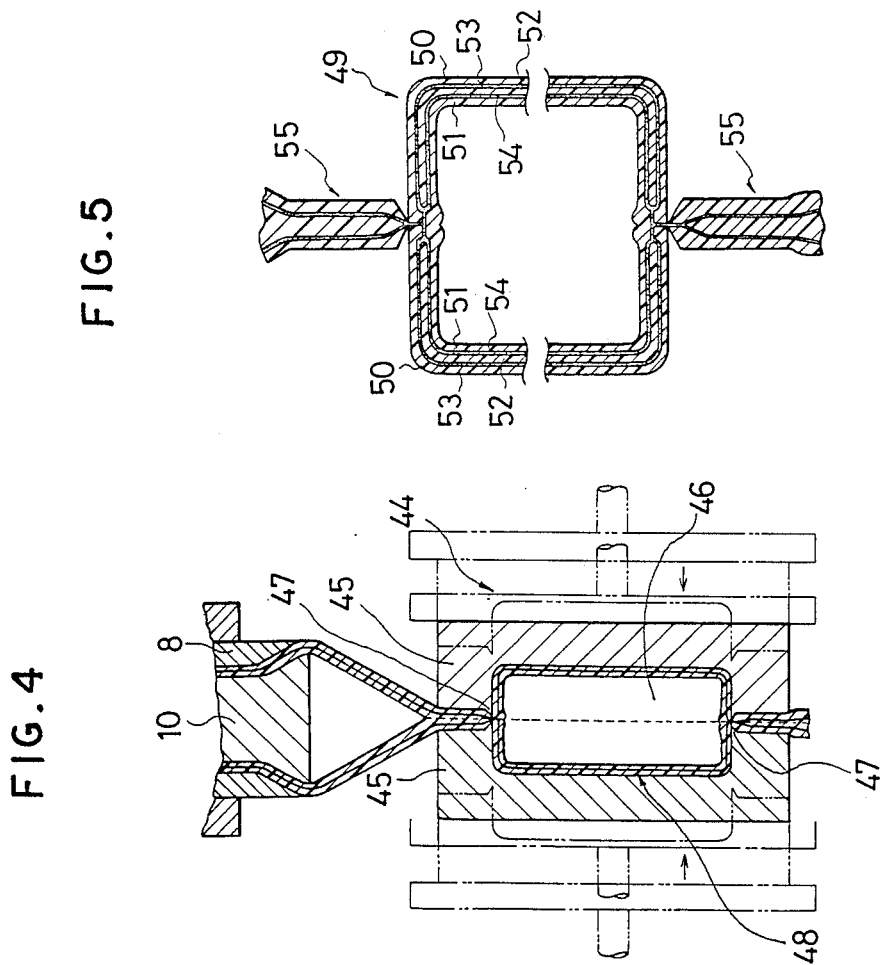

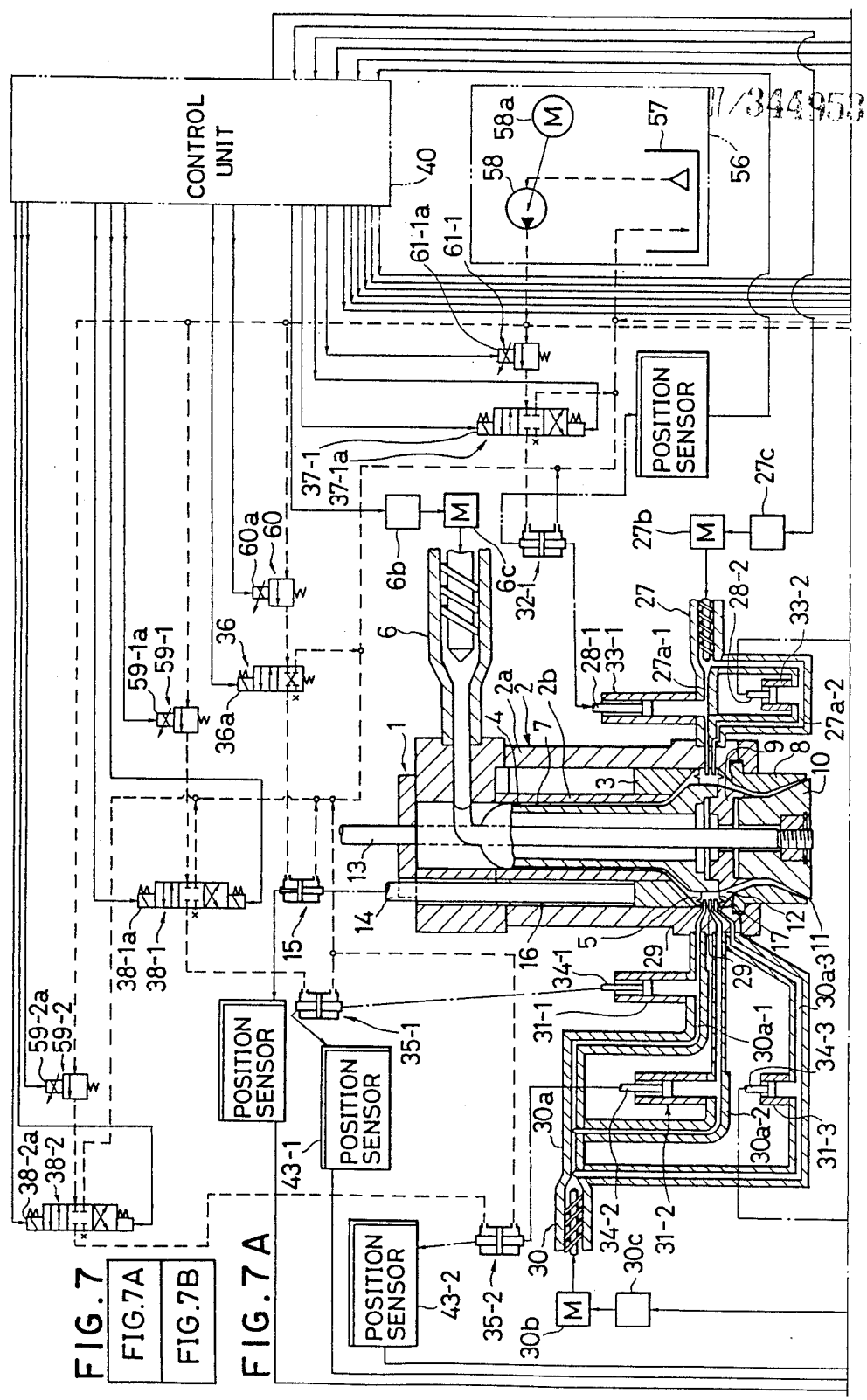

MOLDING DEVICE

BACKGROUND OF THE INVENTION

1. Field of the Invention

The present invention relates to a molding device, and specifically to a blow molding device for manufacturing a hollow product such as a container of multiple layers.

2. Description of the Prior Art

Conventionally, there has been known a method for manufacturing a multiple layer hollow product wherein a multiple layer parison formed of different kinds of molding material is extruded toward a cavity of a molding die, the material thereafter being subjected to a blowing process to form the hollow product.

Japanese Patent Publication No. 55-39448, published for opposition in 1980, discloses a method for manufacturing a multiple layer hollow container wherein a molding device is provided with a supply screw for supplying a main material, a supply screw for supplying an adhesive, and a supply screw for supplying a barrier resin so that the materials are extruded into a cavity through respective passages to form a multiple layer parison of an inner layer of the main material, an intermediate layer of the adhesive, and an outer layer of the barrier resin. The three-layer parison is then subjected to a blow molding process in which the parison is brought into tight contact with an inner surface of the cavity and cooled down so that a three-layer structure hollow container including three different kinds of materials can be obtained.

U.S. Pat. Nos 4,578,025, 4,565,515, 4,522,775, 4,297,092, 3,321,803, 4,120,633, 4,422,838, 4,302,170, 4,185,954, 4,512,943, and 4,472,129 disclose conventional molding devices. Japanese Patent Publication No. 52-37026, and Japanese Patent Public Disclosure No. 58-220738 also disclose conventional molding devices.

There has been also known a device for manufacturing a five-layer hollow container formed with an outer layer of a main resin material, an inner layer of the main resin material, an intermediate layer of an auxiliary resin material, one adhesive layer between the outer layer and the intermediate layer, and the other adhesive layer between the inner layer and the intermediate layer. The device is provided with a main material extruder for extruding the main resin material, an auxiliary material extruder for extruding the auxiliary resin material, an adhesive extruder for extruding the adhesives, a supply cylinder for receiving the materials from the respective extruders and supplying the materials to a cavity of a molding die, three passages for connecting the respective extruder and the cylinder, and accumulators provided on the respective passages for controlling a supply of the materials.

The cylinder is provided with an annular resin reserving chamber at the lower portion thereof in which a ring member is arranged coaxially with the reserving chamber. The main material from the main extruder is divided by the ring member into the outer layer and the inner layer. The ring member is formed with three annular nozzles or an outer nozzle an intermediate nozzle and an intermediate inner nozzle, which are coaxially arranged with respect to each other. The intermediate nozzle is employed for supplying the auxiliary resin material, and the outer and inner nozzle are employed for supplying the adhesives. Thus, a five layer parison of three kinds of materials is introduced into the cavity.

In the above conventional molding device, the accumulators are provided on the respective passage connecting the extruders and the cylinders corresponding to each of the extruders. It will be therefore understood that it is difficult to control a supply of the materials so as to get a uniform thickness of each of the layers forming the parison.

SUMMARY OF THE INVENTION

It is therefore an object of the invention to provide a molding device for manufacturing a multiple layer container in which the molding device can supply each of the materials uniformly without increasing the number of the extruders.

It is another object of the invention to provide a molding device for manufacturing a multiple layer container of uniform layers.

It is yet further object of the invention to provide a molding device for manufacturing a multiple layer container in which the molding device can control a supply of material for each of the layers.

According to the present invention, the above and other objects can be accomplished by a molding device for manufacturing a multiple layer product comprising extruding means for extruding a material to be molded, blow head means for receiving the material from the extruding means and for supplying the material to mold means, passage means connected with the extruding means and divided into a plurality of branch passage means connected respectively with the blow head means, accumulator means provided on each of the branch passage means for controlling a supply of the material through the branch passage means, detecting means provided in the accumulator means for detecting a quantity of the material introduced into the accumulator means, and lock means for locking the accumulator means when the quantity of the material detected by the detecting means reaches a predetermined value.

In a preferred embodiment of the invention, there are provided two or more extruding means for extruding different materials or the same material for making respective layers of the multiple layer hollow product toward the mold means.

The extruding means is connected with reserving chamber means of the blow head means through the passage means. At least one of the extruding means is provided with passage means which is divided into a plurality of branch passage means connected independently with the reserving chamber means for forming respective layers of the product. The passage means of the other extruding means is connected with the blow head means so as to form at least one layer intervening the layer or layers formed of the material from the one of the extruding means.

The molding device may include first extruding means for supplying a first material such as polyethylene resin, second extruding means for supplying a second material such as nylon resin and third extruding means for supplying a third material such as an adhesive, the second and third materials being introduced from two or more branch passage means into the reserving chamber means in a manner such that each of the materials from the first passage means and the branch passage means intervenes with one another. The first material may constitute opposite external layers of the product wherein the second and third materials form internal or intermediate layers of the product in an intervening relationship with one another. Preferably, the present invention can be applied for making a gasoline tank as a multiple layer product and the second material is made of a barrier resin such as nylon resin for preventing gasoline from penetrating into the product. The reserving chamber means is of an annular configuration. Annular nozzle means is disposed in the chamber means to divide the chamber means and the annular nozzle means is formed with passage means for introducing the respective material to form the intermediate layers.

According to the present invention, each of the accumulator means is adapted to measure and store a quantity of the material for one manufacturing cycle. For this purpose, the accumulator means is locked to refuse entry of material thereinto when the material therein reaches a predetermined value so as to control supply of the material introduced into the blow head means. A surplus of material in one locked accumulator means is introduced into other accumulator means which have not yet been locked up because the predetermined quantity has not been reached. Eventually, this accomplishes a uniform supply of the material from each of the branch passage means. As a result, the quantity of the materials for forming the respective layers can be equalized in thickness for each of the layers.

The above and other objects and features of the present invention can be understood based on the following description when reference is made to the accompanying drawings.

BRIEF DESCRIPTION OF THE DRAWINGS

FIG. 4 is a sectional view showing a multiple parison being introduced into a cavity of a mold;

FIG. 5 is a sectional view having a hollow product of multiple layers obtained through a blow molding in accordance with the present invention;

FIGS. 7, 7A, and 7B are a view similar to the FIG. 1 but showing another preferred embodiment;

DESCRIPTION OF THE PREFERRED EMBODIMENTS

Figure 1:
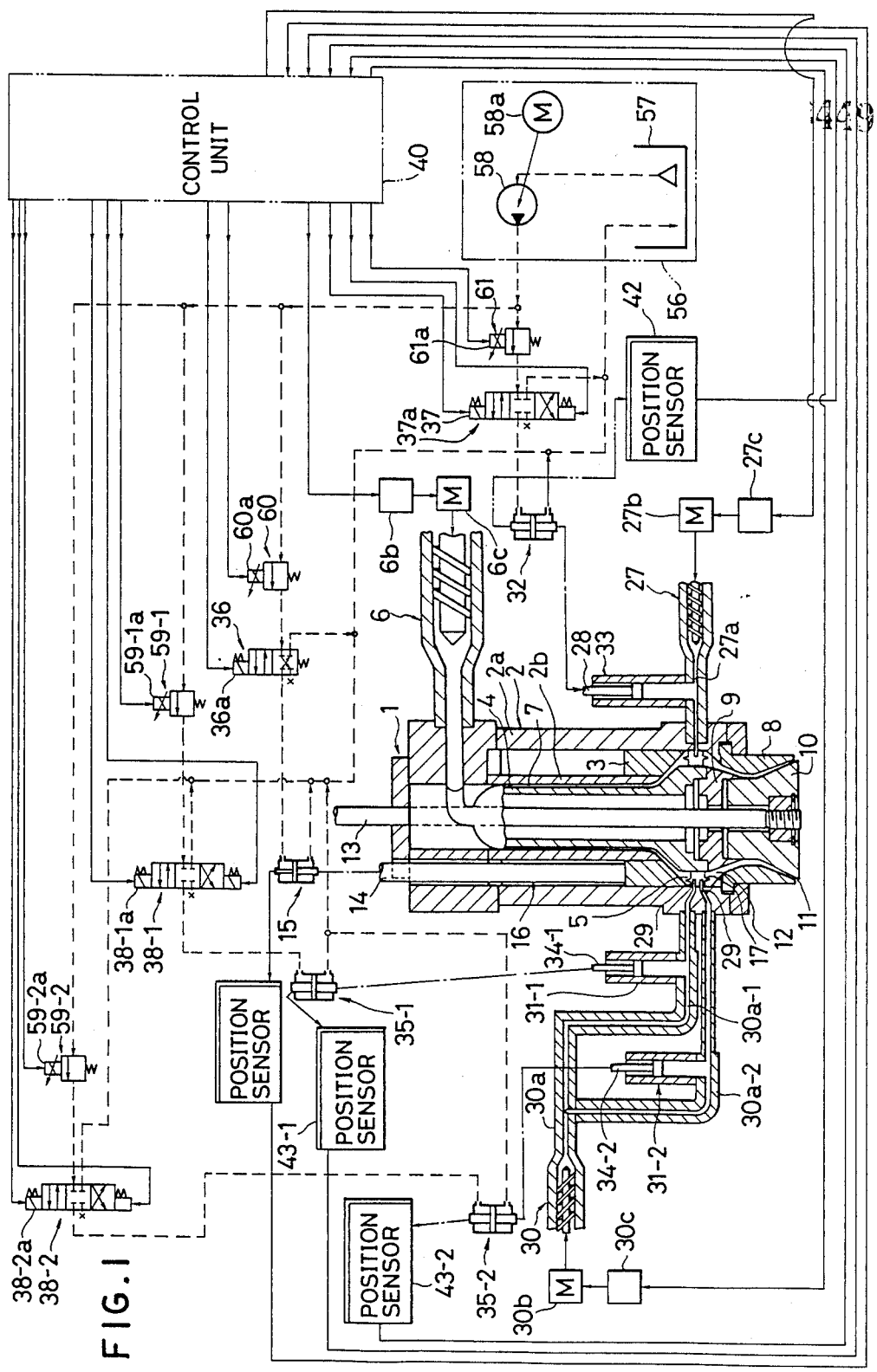
FIG. 1 is a schematic view of a molding device for manufacturing a multiple layer product in accordance with the present invention.
Figure 2:
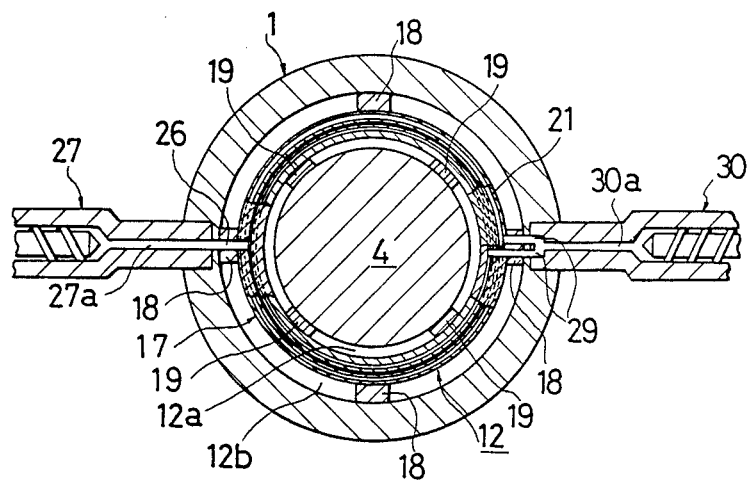
FIG. 2 is a sectional view taken along a line II—II in FIG. 1.
Figure 3:
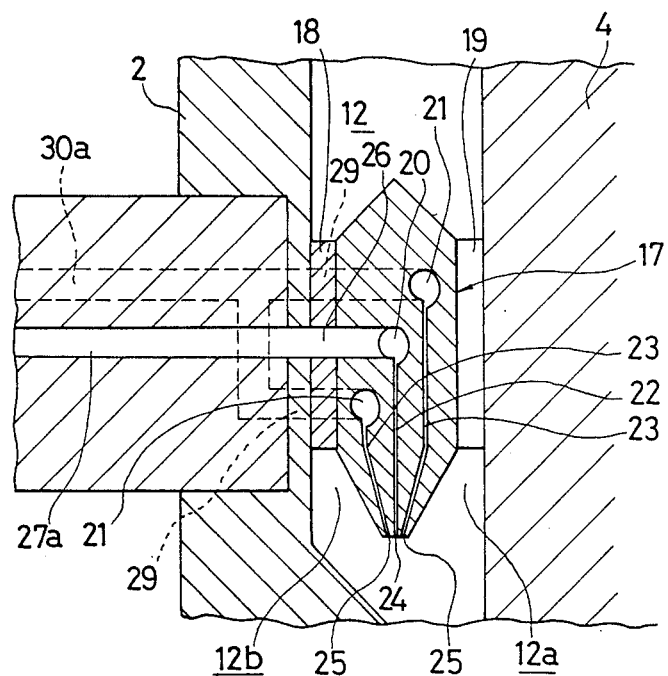
FIG. 3 is an enlarged view of a resin passage.

Referring to the drawings, specifically to FIGS. 1, 2 and 3, a molding device in accordance with the present invention is provided with a cylinder device or blow head device 1 having a head portion at the upper portion and a cylinder portion 2 at the lower end portion. The cylinder portion 2 is constituted by an outer cylinder portion 2a and an inner cylinder portion 2b. There is arranged an annular piston 3 between the outer cylinder 2a and the inner cylinder 2b for moving in contact with both the outer and inner cylinders 2a and 2b. A core assembly 4 is disposed in a middle portion of a space defined by the cylinder device 1 so that the core assembly 4 and inner cylinder 2b and the annular piston 3 define a resin reserving chamber 5 into which a molten main resin material such as polyethylene is introduced from a first extruder 6 through an annular passage 7. The cylinder portion 2, the annular piston 3 and the reserving chamber 5 constitute an accumulator for controlling a supply of the molten main resin material. There is provided a thermostat (not shown) comprising a heater for controlling the temperature of the resin material in the chamber 5 or viscosity thereof. With a lower end of the cylinder portion is coaxially connected an annular molding die 8. With a lower end of the core assembly 4 is connected a core support 9 which movably supports a core body 10 for movement in an up and down direction. The core body 10 is arranged coaxially with the die 8. An outer surface of an upper end portion of the core body 10 is of a conical configuration and an inner surface of an lower end portion of the die 8 has a configuration complementary to the outer surface of the core body 10 and arranged in a spaced relationship with the core body 10 to define an annular die slit 11 therebetween. There is formed an annular material passage 12 between the core support 9 and the core body 10 so that the die slit 11 can be communicated with the chamber 5 through the passage 12.

The core body 10 is connected with a hydraulic cylinder (not shown) through a rod 13 disposed in the core assembly 4 to be moved in the up and down direction for thereby controlling a distance of the die slit 11. The annular piston 3 is provided with a plunger 14 between the outer cylinder 2a and inner cylinder 2b and driven by a first drive cylinder 15 of a single-action cylinder. Thus, the first drive cylinder 15 and the annular piston 3 constitute a first accumulator 16 which supplies the main resin material from the reserving chamber 5 to the die slit 11 through the resin passage 12.

As clearly shown in FIGS. 2 and 3, an annular member 17 of a substantially elongated hexagonal configuration in section is disposed in the material or resin passage 12. The annular member 17 is supported by the outer cylinder 2a through four brackets 18 disposed in a circumferentially spaced relationship with one another and mounted on the outer cylinder 2a. The annular member 17 is also supported by the core assembly 4 through four brackets 19 disposed in a circumferentially spaced relationship with one another and secured to the core assembly 4. The annular passage is divided by the annular member 17 into an inner branch passage 12a and outer branch passage 12b. The annular member 17 is formed with an auxiliary resin passage 20 for supplying an auxiliary resin material such as nylon therethrough at a substantially middle portion thereof. The annular member 17 is also formed with a pair of annular adhesive passages 21 for supplying adhesives therethrough. One of the annular adhesive passages 21 is formed on the outer side of the auxiliary passage 20 and the other of the annular adhesive passages 21 on the inner side of the auxiliary resin passage 20. These annular passages 20, 21 are connected with annular nozzles 24, 25 formed on a lower surface of the annular member 17 through annular slits 22, 23.

The auxiliary resin passage 20 is connected through a passage 26 formed in one of the brackets 18 between the annular member 17 and the outer cylinder 2a with a second extruder 27 arranged outside of the cylinder device 1. The extruder 27 is adapted be driven by a motor 27b connected with a drive section 27c. A passage 27a is formed in the second extruder 27 so as to connect the tip end of the extruder 27 with the annular passage 12. There is provided a second accumulator 33 on the passage 27a for reserving a molten auxiliary resin material from the second extruder 27 temporarily and discharging the auxiliary resin in accordance with reciprocating movement of a plunger 28 which is slidably disposed in a second accumulator 33. The second extruder 27 is provided with a thermostat (not shown) for controlling the temperature of the resin to thereby adjust the viscosity thereof.

The adhesive passages 21 are connected with a third extruder 30 through a pair of passages 29 formed in one of the brackets 18 between the annular member 17 and the outer cylinder 2a. The extruder 30 is connected with a motor 30b controlled by drive section 30c. The third extruder 30 is connected with the reserving chamber 5 through a passage 30a divided into a pair of branch passages 30a-1 and 30a-2 on which accumulators 31-1, 31-2 are respectively mounted for reserving a molten adhesive from the third extruder 30 temporarily and extruding in accordance with a reciprocating movement by means of plungers 34-1 and 34-2 in association with drive cylinders 35-1 and 35-2 of a single-action cylinder device. The accumulators 31-1 and 31-2 are also provided with a thermostat (not shown). The respective passages 21 of the bracket 18 are communicated with the passages 30a-1 and 30a-2 on one hand and with the chamber 5 on the other hand.

Figure 6:
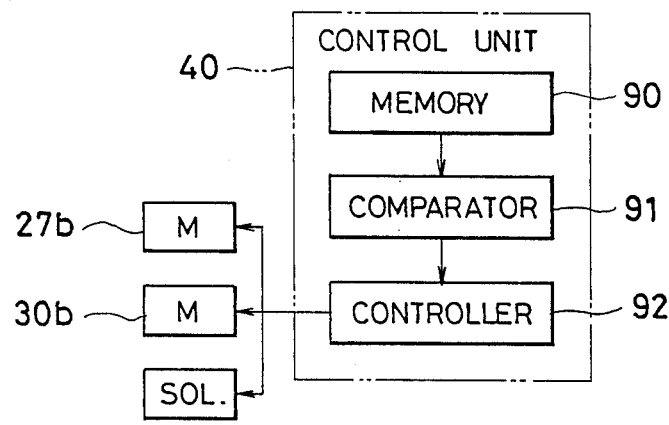
FIG. 6 is a view showing a control unit in accordance with the present invention.

The first cylinder 15 of the first accumulator 16 is connected with a hydraulic unit 56 through a pressure servo valve 60 of a spring return single-action valve provided with a solenoid 60a as a magnetic actuator and a pressure servo valve 36 of a double-action valve with a solenoid 36a as a magnetic actuator. The hydraulic unit 56 is provided with an oil pump 58 and a motor 58a for driving the pump 58. Likewise, the second drive cylinder 32 of the second accumulator 33 is connected with the hydraulic unit 56 through a pressure servo valve 37 of a double-action servo valve with a solenoid 37a as a magnetic actuator and a pressure servo valve 61 of a spring return action valve with a solenoid 61a as a magnetic actuator. Further, the drive cylinder 35-1 of the accumulator 31-1 is connected with the unit 56 through pressure servo valves 38-1, 59-1 provided with magnetic actuators 38-1a and 59-1a respectively. Likewise, the drive cylinder 35-2 is connected with the hydraulic unit 56 through pressure servo valves 38-2, 59-2. Respective solenoids 36a, 37a, 38-1a, 38-2a, 59-1a, 59-2a, 60a, 61a of the magnetic actuators for the servo valves 36, 37 and 38-1, 38-2, 59-1, 59-2, 60 and 61 are electrically connected with a control unit 40 for receiving control signals therefrom. The control unit 40 is provided with a memory 90 for storing a predetermined values of position representative of the plungers 14, 28, 34-1 and 34-2, and comparator 91 as shown in FIG. 6 for comparing the value detected through sensors with the stored value in the memory 90, and producing a signal to a controller 92 which provides control signals to the solenoids 36a, 37a, 38-1a, 38-2a, 59-1a, 59-2a, 60a, 61a of the servo valves 36, 37 and 38-1, 38-2, 59-1, 59-2, 60 and 61 and the drive sections 30c, 27c of the motor 30b and 27b. When the solenoids 36a, 37a, 38-1a, 38-2a, 59-1a, 59-2a, 60a, 61a of the magnetic actuators are energized, the hydraulic pressure is introduced into the cylinders 15, 32 and 35-1, 35-2 so that the plungers 14, 28 and 34-1, 34-2 are moved. The drive cylinders 15, 32, 35-1 and 35-2 are respectively provided with position sensors 41, 42, 43-1 and 43-2. Signals from the position sensors 41, 42 43-1 and 43-2 are transmitted to the control unit 40 so that the control unit 40 controls the positions of the plungers 14, 28 and 34-1, 34-2.

In operation, The control unit 40 provides the solenoids 36a, 37a, 38-1a, 38-2a, 59-1a, 59-2a, 60a and 61a with control signals so that the servo valves 36, 37, 38-1, 38-2, 59-1, 59-2, 60 and 61 are actuated to be moved for allowing the oil from the hydraulic unit 56 to be supplied. This causes downward movement of the plungers 14, 28, 34-1 and 34-2 so that the adhesives and auxillary resin are supplied toward the reserving chamber 5. Meanwhile, the control unit 40 receives signals from the position sensors 41, 42, 43-1 and 43-2 for detecting the positions of the plungers 14, 28 and 34-1 and 34-2.

When the control unit 40 finds, based on the position sensors 41, 42, 43-1 and 43-2 that a quantity of the adhesive and resin materials in any of the accumulators 31-1, 31-2 and 33 and the cylinder device 1 reaches a predetermined value, the control unit 40 is caused to lock operations of the corresponding accumulators 31-1, 31-2 and the cylinder device 1. For instance, where the sensor 43-1 indicates that a quantity of the adhesives in the accumulator 31-1 reaches a predetermined value, the control unit 40 provides the solenoids 38-1a, 59-1a of the valves 38-1, 59-1 with signals for stopping the supply of the hydraulic pressure thereto so that the plunger 34-1 of the accumulator 31-1 is locked.

As a result, the adhesives flow toward the branch passage 30a-1 is reduced into the chamber 5. This means that an introduction of the adhesives in the branch passage 30a-1 is suppressed as compared to the other branch passage 30a-2. In other words, a supply rate of the adhesives can be controlled by controlling the operation of the accumulators 31-1 and 31-2.

If the adhesive in both the accumulators 31-1 and 31-2 reach the predetermined value, the control unit 40 releases both of them and locks both the servo valve 59-1 and 59-2. Thereafter, the third extruder 30 is stopped.

Now referring to FIG. 4, there is shown a parison which is being introduced into a cavity 46 of a mold device 44. The mold device 44 is constituted by a pair of molds 45 defining the cavity 46. The cavity 46 is terminated in facing points 47.

In a molding process, the molds 45 are opened as shown by phantom lines in FIG. 4 and the parison 48 is positioned within the cavity 46. Then, the molds 45 are closed to hold the parison 4. A blowing process is applied to the parison in the cavity 46 to form a multiple layer molding product or container 49 as shown in FIG. 5.

The molding product 49 is formed with a main resin outer layer or first main resin layer 50, a main resin inner layer or second main resin layer 51, an auxiliary resin intermediate layer 52, a first adhesive layer 53 between the first main resin layer 50 and the intermediate layer 52 and a second adhesive layer 54 between the second main resin layer 51 and the intermediate layer 52. Mold flashings 55 are removed from the product 49.

Figure 7B:
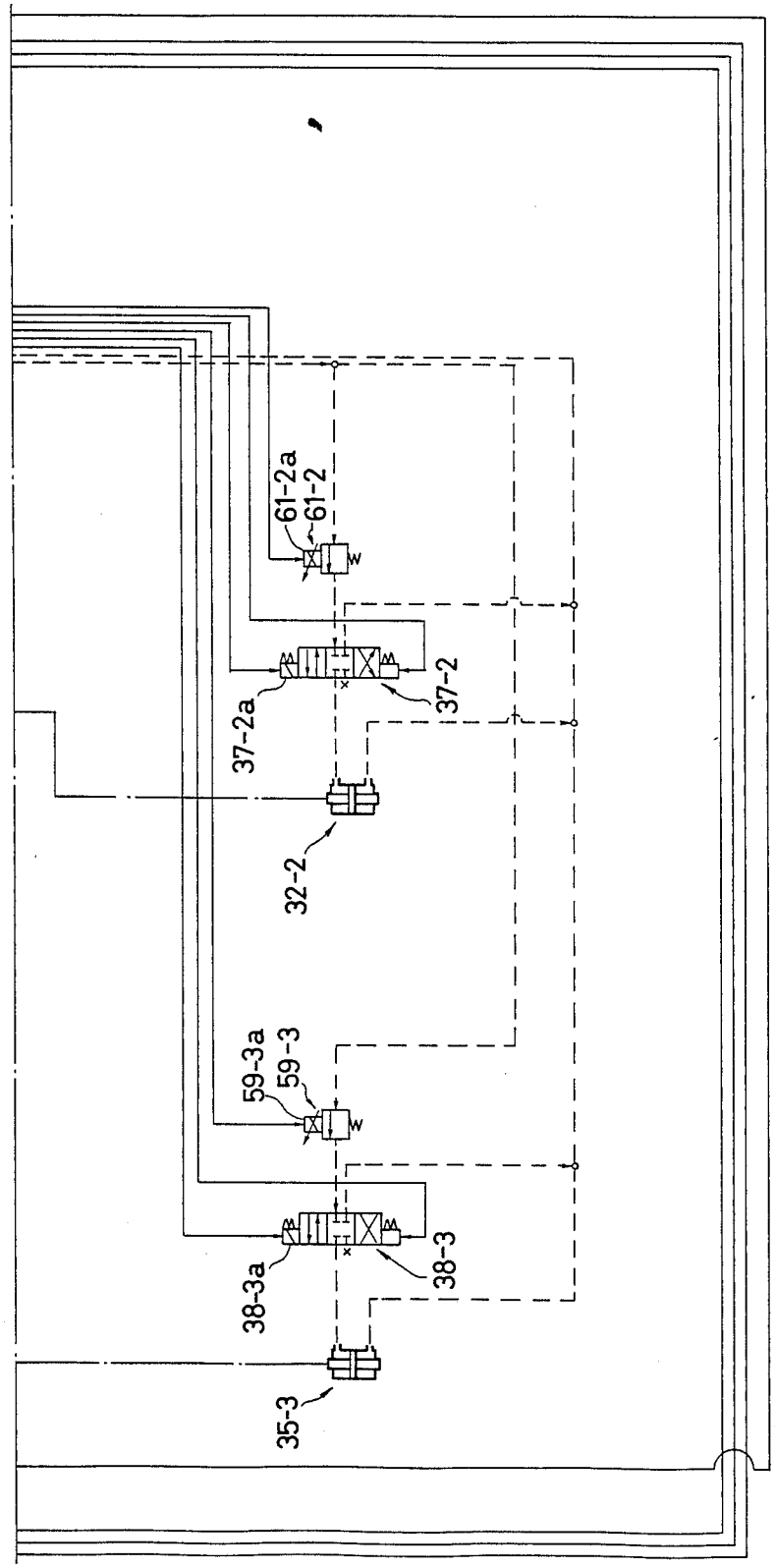
Figure 8:
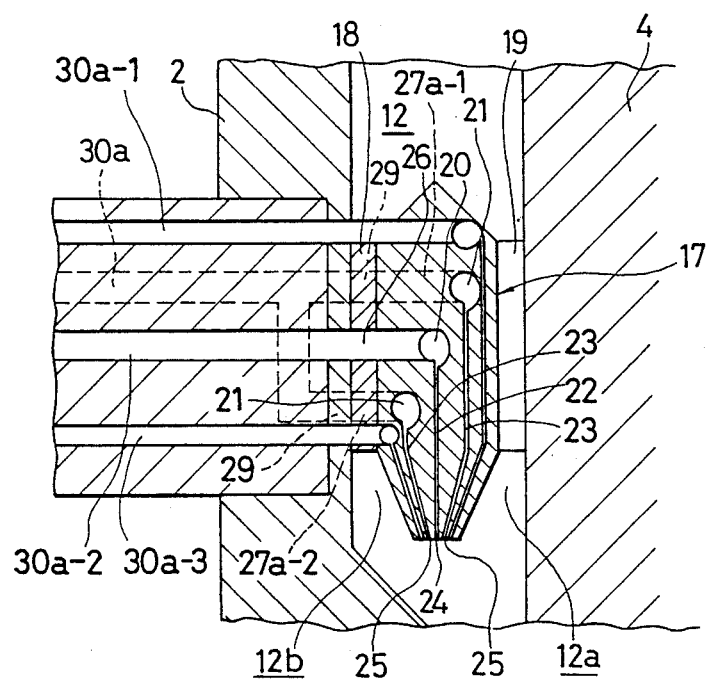
FIG. 8 is a view similar to FIG. 3 but showing another embodiment.

Hereinafter, there is described another preferred embodiment of the invention taking reference with FIG. 7 and 8.

Figure 9:
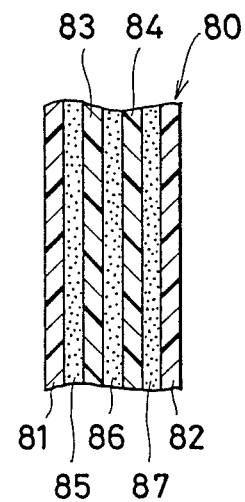
FIG. 9 is a sectional view of a parison in accordance with the embodiment of FIG. 7.

In this embodiment, a seven layer product of three different materials can be obtained by utilizing the present invention. According to this embodiment, the adhesive is introduced into the annular member 17 and in turn the chamber 5 through three different branch passages 30a-1, 30a-2 and 30a-3 as shown in FIG. 8. The auxiliary resin material is introduced into the annular member 17 and the chamber 5 for forming a parison through a pair of branch passages 27a-1 and 27a-2 divided from the passage 27a. The branch passages 30a-1, 30a-2, 30a-3, 27a-1 and 27a-2 are provided with accumulators 31-1, 31-2, 31-3, 33-1 and 33-2. The accumulators 31-1, 31-2, 31-3, 33-1 and 33-2 are adapted to be controlled by servo valves 38-1, 38-2, 38-3, 37-1 and 37-2 through drive cylinders 35-1, 35-2, 35-3, and 32-1, 32-2 based on the signals from the control unit. There are also provided position sensors 43-1, 43-2, 43-2, 42-1, 42-2 for detecting the positions of the plungers 34-1, 34-2, 34-3, 28-1 and 28-2 of the accumulators 31-1, 31-2, 31-3, 33-1 and 33-2 to control the supply rate of the material in the, respective branch passages 30a-1, 30a-2, 30a-3, 27a-1 and 27a-2 to thereby obtain a homogeneous layer of the product. Thus, according to the illustrated embodiment, the parison 80 is provided with seven layers as shown in FIG. 9. That is, the parison includes an inner main resin layer 81 as an innermost layer and an outer main resin layer 82 as an outermost layer of the parison 80. The parison 80 is provided with two auxiliary resin layers 83 and 84. In the parison 80, there are further formed three separated adhesive layers 85, 86 and 87 for separating the resin layers 81, 82, 83 and 84.

It will be apparent from the above description that many modifications and variations may be made by those skilled in the art without departing from the scope of the claimed invention as attached.

I claim:

1. A molding device for manufacturing a multiple layer product comprising:
    a first extruding means for extruding a first material to be molded to form said multiple layer product, said multiple layer product having at least two layers,
    blow head means for receiving the first material from the extruding means and for supplying the first material to mold means,
    first passage means connected with the first extruding means and divided into a plurality of first branch passage means connected respectively with the blow head means for forming different layers of the multiple layer product,
    accumulator means provided on each of the first branch passage means for controlling a supply of the first material toward the blow head means,
    detecting means provided in the accumulator means for detecting a quantity of the first material introduced into the accumulator means, and
    lock means for locking the accumulator means when the first material detected by the detecting means reaches a predetermined quantity.

2. A molding device in accordance with claim 1 wherein the detecting means detects a position of a plunger means of the accumulator means to detect the predetermined quantity of the first material in the accumulator means, the lock means holding the plunger means at a predetermined position when the detecting means detects the predetermined quantity.

3. A molding device in accordance with claim 2 and further comprising control means for receiving a signal from the detecting means and controlling the plunger to a predetermined position.

4. A molding device in accordance with claim 3 wherein the control means stops the extruding means when the material in all of the accumulator means reach the predetermined quantity.

5. A molding device in accordance with claim 3 wherein the control means releases the plunger means of the accumulator means and thereafter stops the extruding means when all of the accumulator means reach the predetermined quantity.

6. A molding device in accordance with claim 3 wherein the control means is provided with memory means for storing respective predetermined quantities for the accumulator means, a comparator for comparing signals from the memory means and signals from the detecting means and a controller for controlling the position of the plunger means corresponding to the predetermined quantity of the material based on the signal from the comparator.

7. A molding device in accordance with claim 1 wherein the multiple layer product further comprises a second material and a third material, the second material forming opposite external layers of the multiple layer product and the third material forming at least one intermediate layer disposed between the opposite external layers.

8. A molding device in accordance with claim 7 wherein the blow head means comprises cylinder means for defining reserving chamber means which constitutes accumulator means for receiving the second material and for controlling a supply of the second material to the mold means.

9. A molding device in accordance with claim 7 wherein the first material forms at least two intermediate layers disposed between the opposite external layers.

10. A molding device in accordance with claim 9, and further comprising second extruding means for supplying the second material and third extruding means for supplying the third material, the second extruding means being connected with reserving chamber means defined in the blow head means through second passage means, the third extruding means being connected with the reserving chamber means through third passage means, the first passage means and third passage means extending into the second passage means.

11. A molding device in accordance with claim 10, and further comprising annular nozzle means arranged in the reserving chamber means to partition the reserving chamber means, the second passage means having an annular configuration, the third passage means being divided into a plurality of third branch passage means, the first branch passage means and the third branch passage means being respectively connected with the reserving chamber means through the annular nozzle means.

12. A molding device in accordance with claim 11, further comprising a plurality of bracket means for supporting the annular nozzle means, the first passage means and third passage means being extended through the bracket means to reach the reserving chamber means.

13. A molding device in accordance with claim 8 wherein the third branch passage means are provided with accumulator means.

14. A molding device in accordance with claim 11 wherein the third material forms a plurality of independent and intermediate layers and the first material also forms a plurality of independent and intermediate layers, each of the plurality of independent and intermediate layers of the first material and each of the plurality of independent intermediate layers of the third material being arranged in an intervening relationship with one another with regard to material.

15. A molding device in accordance with claim 14 wherein the product is a gasoline tank and the third material is of a barrier resin for preventing the gasoline from penetrating into the product.

16. A molding device in accordance with claim 14 wherein each of the first branch passage means and the third branch passage means is provided with accumulator means.

17. A molding device in accordance with claim 9 wherein the first material is made of adhesive forming at least one layer disposed between a layer of the second material and a layer of the third material.

18. A molding device in accordance with claim 17 wherein the product is a gasoline tank and the third material is a barrier resin for preventing the gasoline from penetrating into the product.

19. A molding device in accordance with claim 18 wherein the second material is a polyethylene resin and the third material is a nylon resin.

20. A molding device in accordance with claim 18 wherein the second material is a polyethylene resin and the third material is a nylon resin.

* * * * *